United States Patent
Tsai

(10) Patent No.: US 7,671,897 B2
(45) Date of Patent: Mar. 2, 2010

(54) IMAGE OUTPUT AND INPUT SYSTEMS

(75) Inventor: Chia-Lin Tsai, Chupei (TW)

(73) Assignee: Sonix Technology Co., Ltd., Chupei (TW)

( * ) Notice: Subject to any disclaimer, the term of this patent is extended or adjusted under 35 U.S.C. 154(b) by 1128 days.

(21) Appl. No.: 11/261,503

(22) Filed: Oct. 31, 2005

(65) Prior Publication Data

US 2006/0187347 A1    Aug. 24, 2006

(30) Foreign Application Priority Data

Feb. 24, 2005    (TW) ............................... 94105689 A

(51) Int. Cl.
| | |
|---|---|
| H04N 5/04 | (2006.01) |
| H04N 9/73 | (2006.01) |
| H04N 5/10 | (2006.01) |
| H04N 7/00 | (2006.01) |
| H04N 5/235 | (2006.01) |

(52) U.S. Cl. ................... 348/222.1; 348/226.1; 348/529
(58) Field of Classification Search .............. 348/226.1, 348/227.1, 228.1, 536–549, 312, 521–524, 348/512, 187, 500, 529, 513, 222.1
See application file for complete search history.

(56) References Cited

U.S. PATENT DOCUMENTS

| | | | | |
|---|---|---|---|---|
| 4,831,444 A | * | 5/1989 | Kato | ............................ 348/518 |
| 5,926,219 A | * | 7/1999 | Shimizu et al. | .............. 348/362 |
| 6,275,265 B1 | * | 8/2001 | Kimura et al. | .............. 348/536 |
| 2003/0169356 A1 | * | 9/2003 | Suemoto | ...................... 348/294 |
| 2006/0022862 A1 | * | 2/2006 | Egawa et al. | ................. 341/155 |
| 2008/0002034 A1 | * | 1/2008 | Tsai | ......................... 348/222.1 |
| 2008/0309818 A1 | * | 12/2008 | Weng et al. | .................. 348/537 |

* cited by examiner

*Primary Examiner*—Tuan Ho
*Assistant Examiner*—Marly Camargo
(74) *Attorney, Agent, or Firm*—Muncy, Geissler, Olds & Lowe, PLLC

(57) ABSTRACT

An image output/input system includes a phase comparator, an image synchronous signal generator, a sensor timing generator, a sensor, an image/color processing unit, and a video encoder. The phase comparator receives a digital signal and a vertical synchronous signal and compares their period and phase to generate a clock correction signal. The image synchronous signal generator receives the clock correction signal and adjusts a subsequent period of the vertical synchronous signal according to the clock correction signal. The sensor timing generator receives the vertical synchronous signal and generates the sensor control timing, and the sensor receives the sensor control timing and generates raw image data. The image/color processing unit receives the raw image data and deals with the image and color process of the raw image data to generate target image data. The video encoder receives the vertical synchronous signal and the target image data and encodes them to generate analog encoded image data.

11 Claims, 8 Drawing Sheets

IMAGE OUTPUT AND INPUT SYSTEMS

FIELD OF THE INVENTION

The invention relates to an image processing system, and, more particularly, to an image output/input system

DESCRIPTION OF THE RELATED ART

FIG. 1 shows a block diagram illustrating a typical image output/input system. Referring to FIG. 1, the image output/input system 10 includes a voltage comparator 12, a phase locked loop 13, an image synchronous signal generator 133, a sensor-timing generator 14, a sensor 15, an image/color processing unit 16, a timing generator 17, and a video encoder 18. Note that, in the image output/input system 10, a output clock signal P1 generated from the phase locked loop 13 and synchronized with a power source (alternating current) 11 is fed to the image synchronous signal generator 133, the sensor-timing generator 14, the image/color processing unit 16, and the video encoder 18 to replace the system clock adopted in a typical digital system. Hence, the image synchronous signal generator 133, the sensor-timing generator 14, the image/color processing unit 16, and the video encoder 18 are all synchronized with the power source 11 to achieve the effect of locking the frequency and phase of the power source 11. On the other hand, other components in the image output/input system 10 still operate in reference to the original system clock.

The image output/input system 10 converts an analog signal V (generated from a typical power source, light source, etc.) into a digital signal V1 by means of the voltage comparator 12. In this embodiment, the analog signal V is represented as the power source 11 having a frequency of 50 Hz, 60 Hz, or other selected value. The phase locked loop 13 analogically multiplies the frequency of the digital signal V1 to a desired operation frequency and generates an output clock signal P1. The image synchronous signal generator 133 receives the output clock signal P1 and generates a vertical synchronous signal VSYNC. Then, the phase locked loop 13 receives the vertical synchronous signal VSYNC and compares it with the digital signal V1 to adjust the frequency of the output clock signal P1. Thereby, the frequency of the vertical synchronous signal VSYNC is synchronized with the power source 11. The sensor timing generator 14 receives the vertical synchronous signal VSYNC and the output clock signal P1 to generate the sensor control timing S, which includes a clock signal and multiple control signals for controlling the sensor 15. The sensor 15 receives the sensor control timing S and generates raw image data Sr after acquiring images. The image/color processing unit 16 receives the raw image data Sr and the output clock signal P1 and deals with the image and color process of the raw image data Sr to generate a target image data T. Then, the video encoder 18 receives the clock signal CK generated from the timing generator 17, the output clock signal P1, and the target image data T and outputs an analog encoded image data O after integrating and encoding these signals.

However, the conventional image output/input system 10, when actually applied, may result in problems as described below.

1. When the image output/input system 10 acquires images by the sensor 15, because the environment provided for taking pictures often serves with an artificial light source (such as a daylight lamp, a incandescent lamp, etc.) rather than a nature light source (such as sunshine), and the lighting frequency of the artificial light source tends to vary following the frequency fluctuation of the power source, the image flicker and color shift continually occur as the sensor 15 operates to worsen the quality of the output image. To solve this problem, typically, the exposure time of the sensor 15 must be lengthened, or the exposure time point of the sensor 15 must be made to be synchronized with the frequency and phase of the artificial light source. However, since the exposure time cannot excess a saturated value of the sensor 15, the way of lengthening the exposure time does not work under certain conditions. On the other hand, the way of synchronization for the exposure time point obviously raises the cost, and further, since the anti-noise capability for the phase locked loop 13 is inferior, the output clock signal P1 may fail to lock the frequency of the power source to cause the sensor control timing S to be no longer synchronized with the power source as the noises become considerable. In that case, the exposure time point of the sensor 15 fails to be synchronized with the frequency of the light source, and thus the image flicker and color shift still occur.

2. Referring to FIG. 2, the video encoder 18 includes a video timing generator 181, a luminance/synchronous signal generator 182, two digital to analog converters 183 and 185, and a chroma/burst signal generator 184. Typically, a chroma/burst signal generator 184 requires a very accurate clock signal to deal with the chroma and the burst managements. However, since the output clock signal P1 from the phase locked loop 13 needs to lock the frequency of the power source 11 and thus follows the frequency fluctuation of the power source 11, the output clock signal P1 is often inaccurate. Besides, the anti-noise capability for the phase locked loop 13 is inferior, and this also results in an inaccurate and unstable output of the clock signal P1. Under the circumstance, an additional timing generator 17 is needed to provide a very accurate clock signal CK for the chroma/burst signal generator 184. For example, according to the National Television System Committee (NTSC) video standard, the clock signal CK of the chroma and the burst managements equals 3.579545 MHz and has an accept error of ±5 Hz to conform to the NTSC video standard. Because of this, the luminance/synchronous signal generator 182 and the chroma/burst signal generator 184 need to receive different clock signals and generate different output signals conforming to their respective specification, and thus two digital to analog converters 183 and 185 are needed to raise the manufacture cost.

BRIEF SUMMARY OF THE INVENTION

Hence, an object of the invention is to provide an image output/input system that synchronizes the exposure time point of its sensor with the frequency of an analog signal generated from a power source or a light source, so that the image flicker and color error occurring when the sensor acquires images are eliminated, and the number of required digital to analog converters is decreased to reduce cost.

According to the invention, an image output/input system includes a phase comparator, an image synchronous signal generator, a sensor timing generator, a sensor, an image/color processing unit, and a video encoder. The phase comparator receives a digital signal and a vertical synchronous signal and compares their period and phase to generate a clock correction signal, where the digital signal is converted from an analog signal through a voltage comparator (or the analog-to-digital conversion).

The image synchronous signal generator receives the clock correction signal, generates the vertical synchronous signal, and adjusts a subsequent period of the vertical synchronous signal according to the clock correction signal. The sensor timing generator receives the vertical synchronous signal and generates the sensor control timing according to the vertical synchronous signal, and the sensor receives the sensor control timing and generates raw image data after acquiring images. The image/color processing unit receives the raw image data and deals with the image and color process of the raw image data to generate target image data. The video encoder receives the vertical synchronous signal and the target image data and encodes the vertical synchronous signal and the target image data to generate an analog encoded image data.

Through the design of the invention, the image output/input system uses the sensor/video period compensation unit to compensate the period of the vertical synchronous signal from the image synchronous signal generator in reference to a digital signal. Hence, the error of the vertical synchronous signal is limited in a very small range, and the vertical synchronous signal is synchronized with the frequency and phase of the analog signal. Since the vertical synchronous signal is synchronized with the analog signal in frequency and phase, the sensor timing generator may generate the sensor control timing that is synchronized with the analog signal, and the sensor control timing for the sensor is used as a reference to decide the time point of exposure. Accordingly, the time point of exposure for the sensor is synchronized with the analog signal and further synchronized with the frequency and phase of the artificial light source to eliminate the image flicker and color error.

Also, since the overall image output/input system operates in reference to an identical system clock, the video encoder may deal with the integration and encoding of the luminance, chroma, burst, and synchronization at a time. Hence, the image output/input system needs only one digital to analog converter and thus has a reduced cost.

DETAILED DESCRIPTION OF THE INVENTION

The image output/input system according to the invention will be described with reference to the accompanying drawings.

Figure 3:
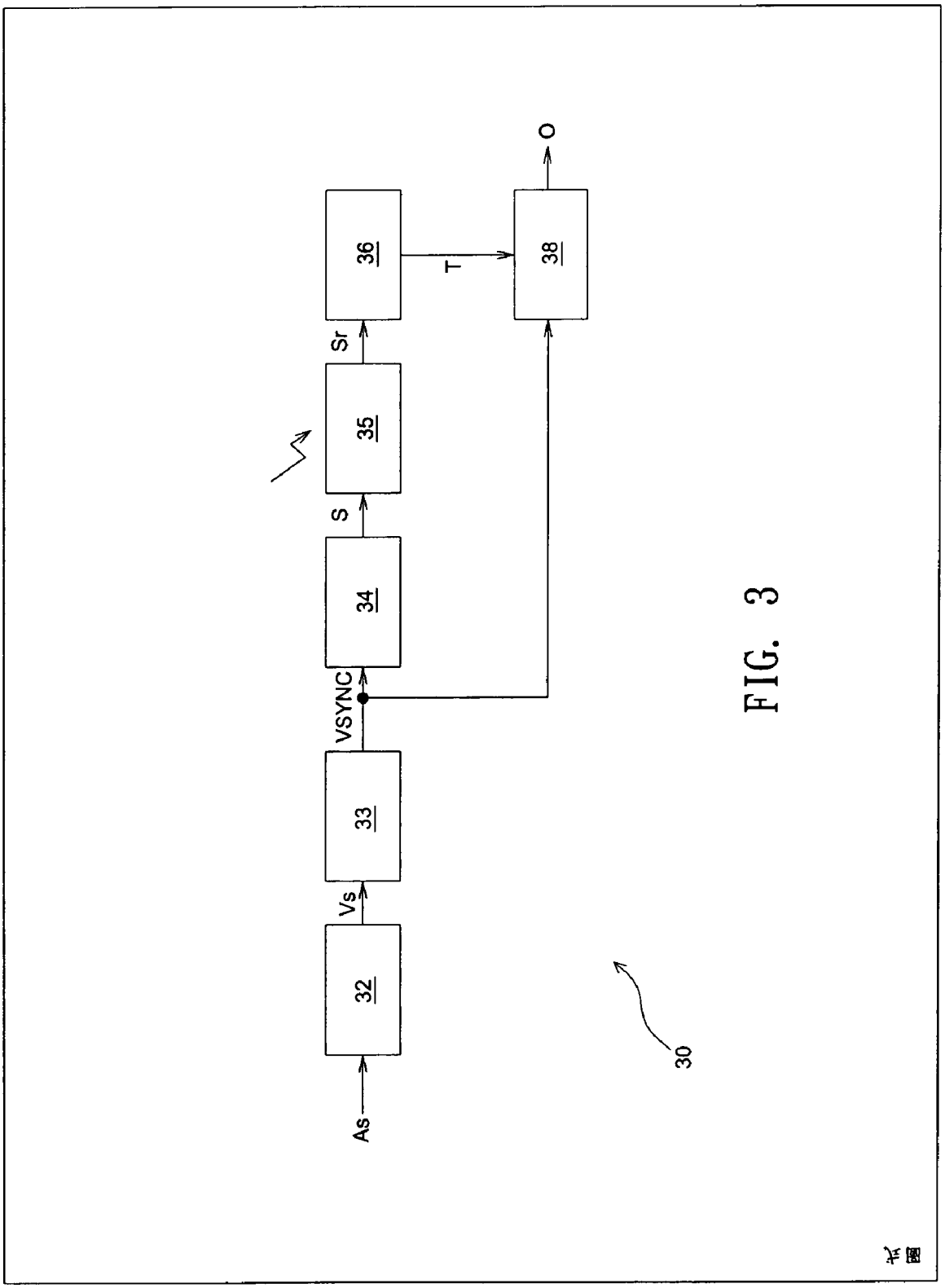
FIG. 3 shows a block diagram illustrating an image output/input system according to the invention.

FIG. 3 shows a block diagram illustrating an image output/input system according to the invention. The image output/input system 30 includes a voltage comparator 32, a sensor/video period compensation unit 33, a sensor timing generator 34, a sensor 35, an image/color processing unit 36, and a video encoder 38. Note that all components in the image output/input system 30 operate in reference to the original system clock, which is different compared to conventional image output/input system 10. Hence, the system clock received by each component is not additionally indicated in FIG. 3.

The voltage comparator 32 receives an analog signal As and then converts it into a digital signal Vs whose frequency and phase are synchronized with that of the analog signal As. The voltage comparator 32, well known in the art and thus not explaining in detail, may be an analog to digital converter. Also, the voltage comparator 32 may further incorporate a circuit capable of eliminating noises, such as a digital filter, to improve the quality of the digital signal Vs. The analog signal As may be generated by a signal source such as a power source and a light source, and, particularly the light source, a photo sensor may directly sense the light source and transform its emitting light into electrical signals.

Figure 4A:
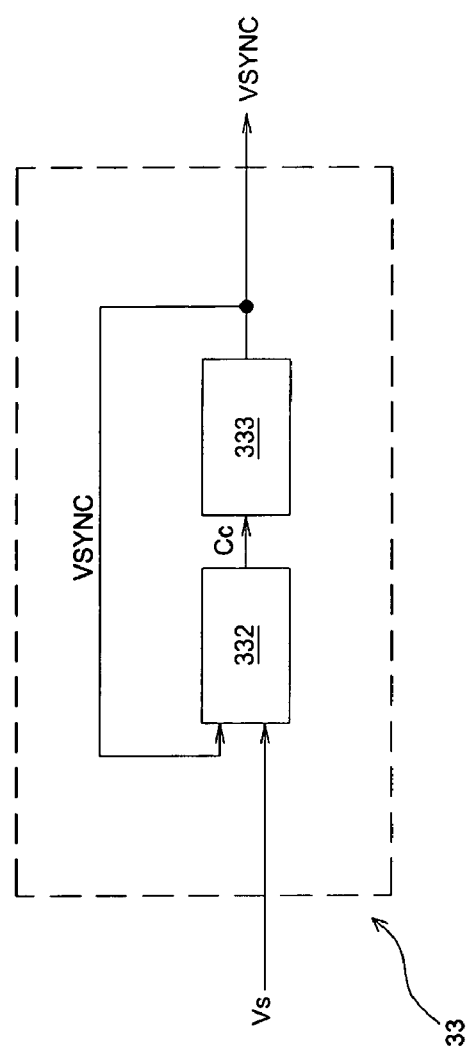
FIG. 4A shows a schematic diagram illustrating a sensor/video period compensation unit according to the invention.

The sensor/video period compensation unit 33 receives the digital signal Vs, generates a vertical synchronous signal VSYNC, and compensates the period of the vertical synchronous signal VSYNC to allow the vertical synchronous signal VSYNC and the digital signal Vs to have identical lengths of period (i.e., frequency synchronization). Referring to FIG. 4A, the sensor/video period compensation unit 33 includes a phase comparator 332 and an image synchronous signal generator 333. The phase comparator 332 receives the digital signal Vs and the vertical synchronous signal VSYNC and compares their period and phase to generate a clock correction signal Cc. The image synchronous signal generator 333, used for generating the vertical synchronous signal VSYNC, receives the clock correction signal Cc. Meanwhile, the image synchronous signal generator 333 adjusts the length of a subsequent period of the vertical synchronous signal VSYNC according to the clock correction signal Cc. Thus, through the process of repeatedly adjusting the period of the vertical synchronous signal VSYNC in reference to the digital signal Vs, the vertical synchronous signal VSYNC is synchronized with the analog signal As in frequency and phase. For example, at a time point assume the period of the vertical synchronous signal VSYNC lags behind that of the digital signal Vs (synchronized with the analog signal As in frequency) with 50 clocks, the phase comparator 332 will generate a clock correction signal Cc after comparing them and instruct the image synchronous signal generator 333 to shorten the length of a subsequent period of the vertical synchronous signal VSYNC with 50 clocks, so that the vertical synchronous signal VSYNC is synchronized with the analog signal As in frequency and phase.

Figure 4B:
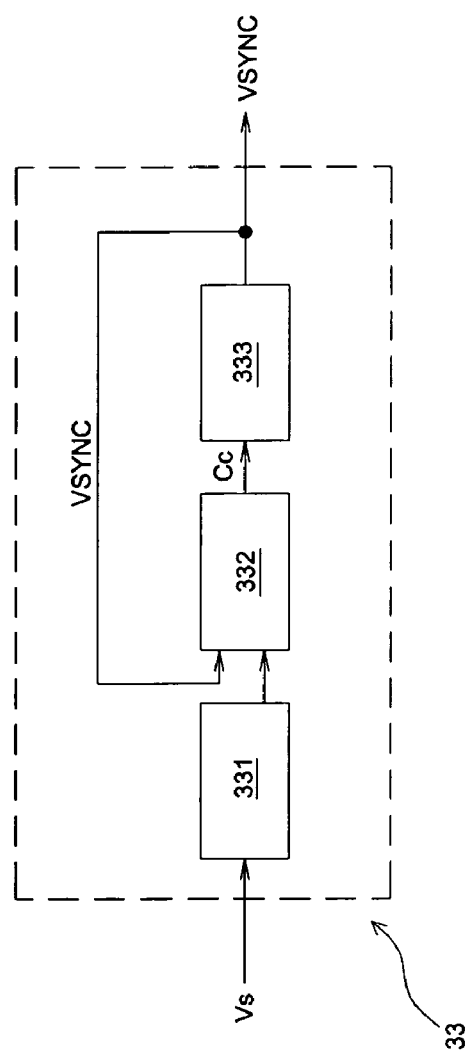
FIG. 4B shows another schematic diagram illustrating a sensor/video period compensation unit according to the invention.

Also, the sensor/video period compensation unit 33 may further include a phase adjusting unit for adjusting the phase of the digital signal Vs. Referring to FIG. 4B, the phase adjusting unit 331 receives the digital signal Vs and delays the phase of the digital signal Vs to a preset time point in reference to the period of the digital signal Vs. Certainly, the phase delay value of the digital signal Vs may be set by firmware, software, hardware, or their combination.

The operations regarding image input are described below.

The sensor timing generator 34 receives the vertical synchronous signal VSYNC and generates the sensor control timing S for the sensor 35 according to the vertical synchronous signal VSYNC. The sensor 35 receives the sensor control timing S and generates raw image data Sr after acquiring images. The image/color processing unit 36 receives the raw image data Sr and deals with the image and color process of the raw image data Sr to generate target image data T having improved image quality. Since the vertical synchronous signal VSYNC is synchronized with the analog signal As in frequency and phase, the sensor timing generator 34 may generate the sensor control timing S that is synchronized with the analog signal As, and the sensor control timing S for the sensor 35 is used as a reference to decide the time point of exposure. Accordingly, the time point of exposure for the sensor 35 is synchronized with the analog signal As and further synchronized with the frequency and phase of the artificial light source driven by the analog signal As to eliminate the image flicker and color error.

The operations regarding image output are described below.

Figure 5:
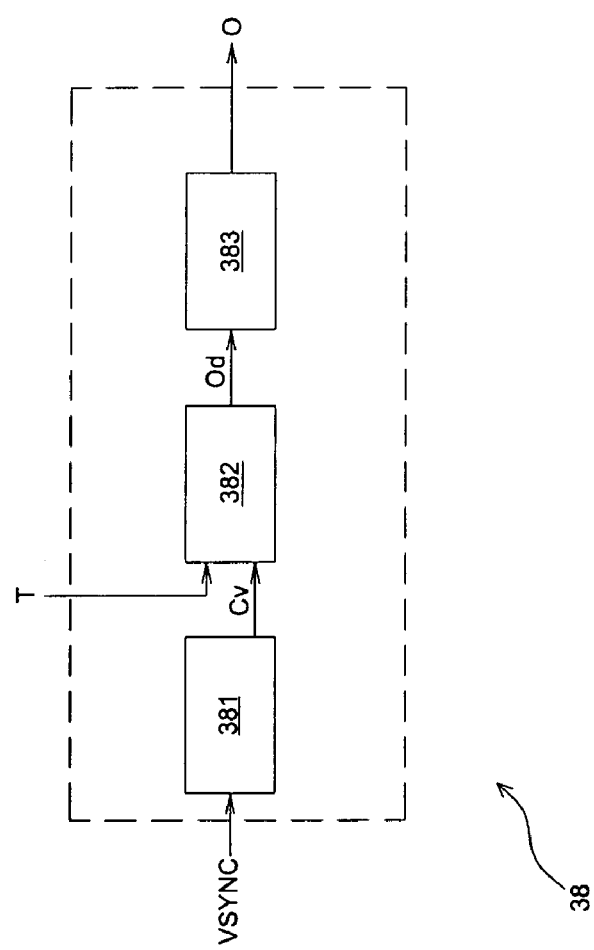
FIG. 5 shows a block diagram illustrating a video encoder according to the invention.

The video encoder 38 receives the vertical synchronous signal VSYNC and the target image data T and encodes the synchronous signal VSYNC and the target image data T to generate analog encoded image data O. Referring to FIG. 5, the video encoder 38 includes a video timing generator 381, a luminance/chroma/burst/synchronous signal generator 382, and a digital to analog converter 383. The video timing generator 381 receives the vertical synchronous signal VSYNC and generates a video timing Cv according to the vertical synchronous signal VSYNC.

Figure 1:
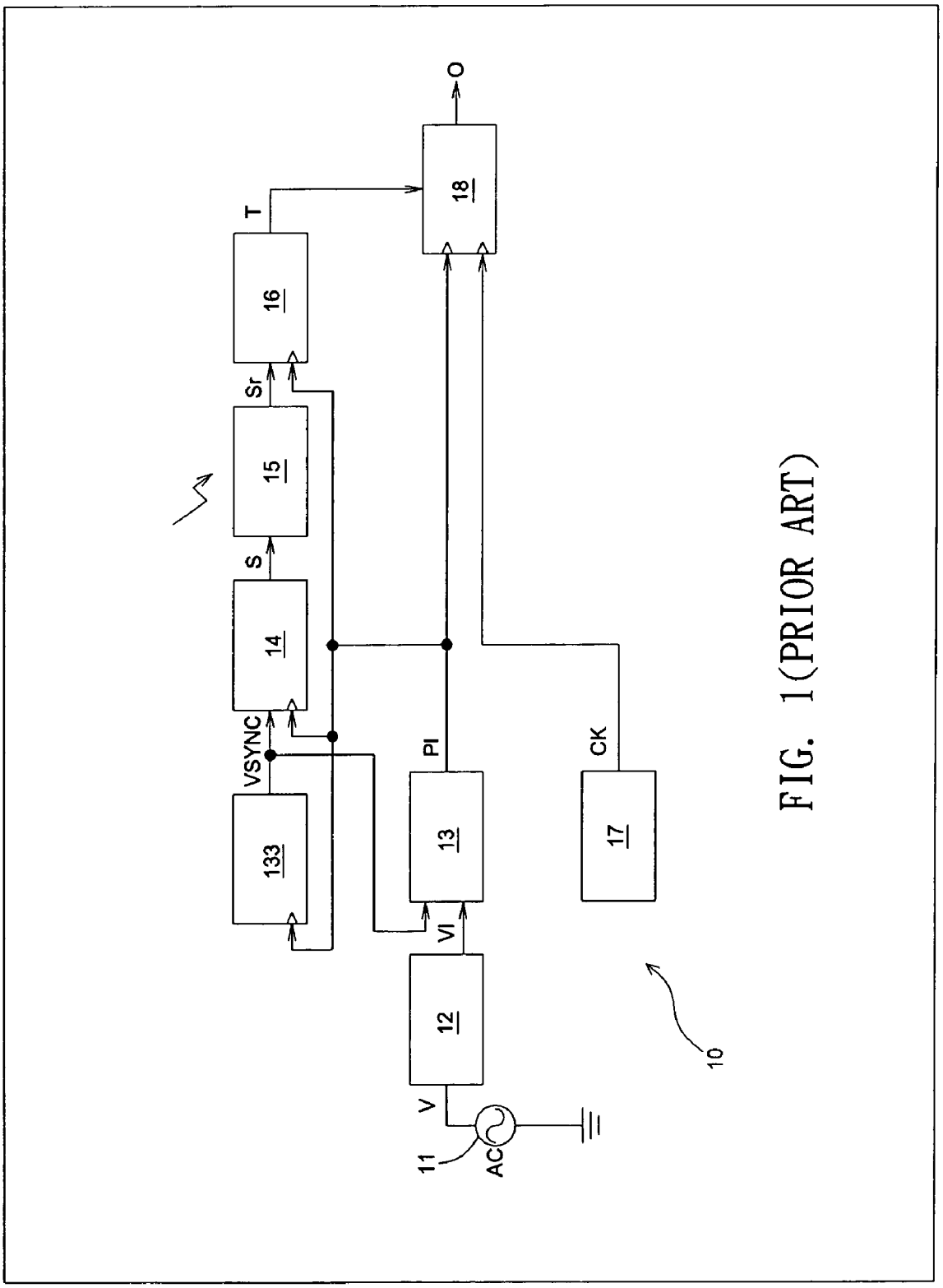
FIG. 1 shows a block diagram illustrating a conventional image output/input system.
Figure 2:
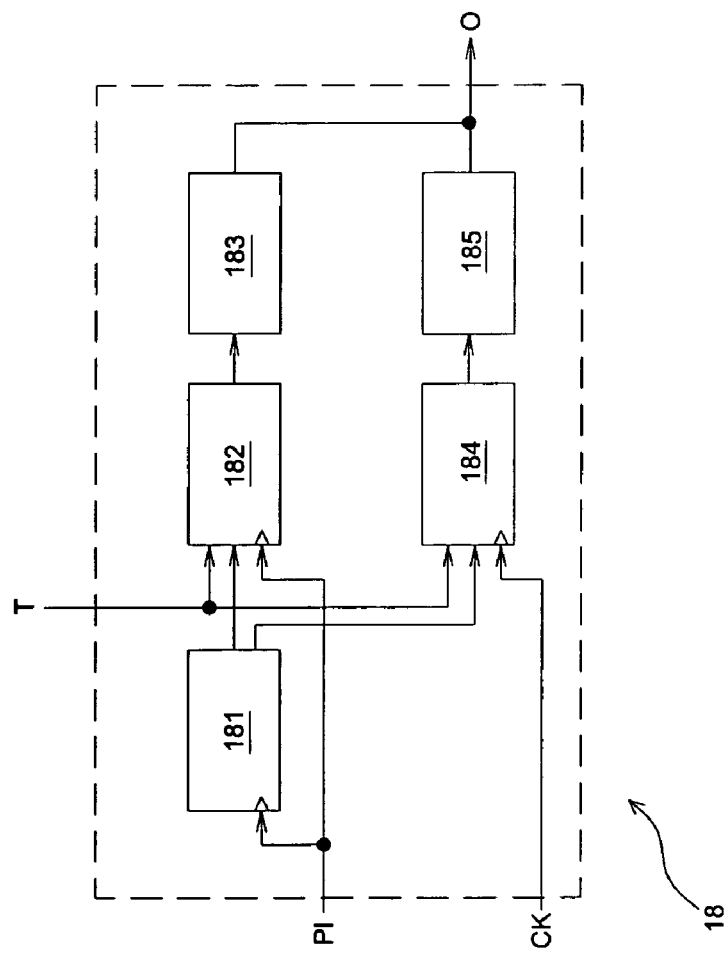
FIG. 2 shows a block diagram illustrating a conventional video encoder.

The luminance/chroma/burst/synchronous signal generator 382 receives the video timing Cv and the target image data T, deals with the integration and encoding for the luminance, chroma, burst, and image synchronization, and then outputs digital encoded image data Od. The digital to analog converter 383 receives and converts the digital encoded image data Od into analog encoded image data O. According to the invention, all components in the image output/input system 30 operate in reference to the original system clock, thus different to the conventional art where the phase locked loop 13 and the timing generator 17 should be added to provide two different clocks for the video encoder 38. Hence, according to the invention, the chroma and burst managements (implemented by the chroma/burst signal generator 184 shown in FIG. 2) that demand a considerably small frequency error may adopt the same system clock used in the luminance and synchronization managements (implemented by the luminance/synchronous signal generator 182 shown in FIG. 2). Thus, the clock generator 17 (shown in FIG. 1) used for providing accurate system clock signal CK can be omitted, and further the digital to analog converter 185 (shown in FIG. 2) can be omitted. Therefore, the chroma, burst, luminance and synchronization managements are integrated and implemented by a single luminance/chroma/burst/synchronous signal generator 382, and thus the video encoder 38 needs only one digital to analog converter 383 to perform digital to analog conversion, resulting in an reduced cost for the image output/input system 30.

The image output/input system 30 differs from the conventional one in that the image output/input system 30 uses the sensor/video period compensation unit 33 to compensate the period of the vertical synchronous signal VSYNC from the image synchronous signal generator 333 in reference to a digital signal Vs (synchronized with the analog signal As in frequency). Hence, the error of the vertical synchronous signal VSYNC is limited in a very small range, and the vertical synchronous signal VSYNC is synchronized with the frequency of the analog signal As to allow the exposure time point of the sensor 35 in the image output/input system 30 to be synchronized with the frequency of the analog signal As. This eliminates the image flicker and color shift occurring when the sensor 35 acquires images.

Also, since the image output/input system 30 directly adopt the same system clock as a clock signal, the video encoder 38 may deal with the integration and encoding of the luminance, chroma, burst, and synchronization at the same clock. Hence, the image output/input system 30 needs only one digital to analog converter and thus has a reduced cost.

Figure 6A:
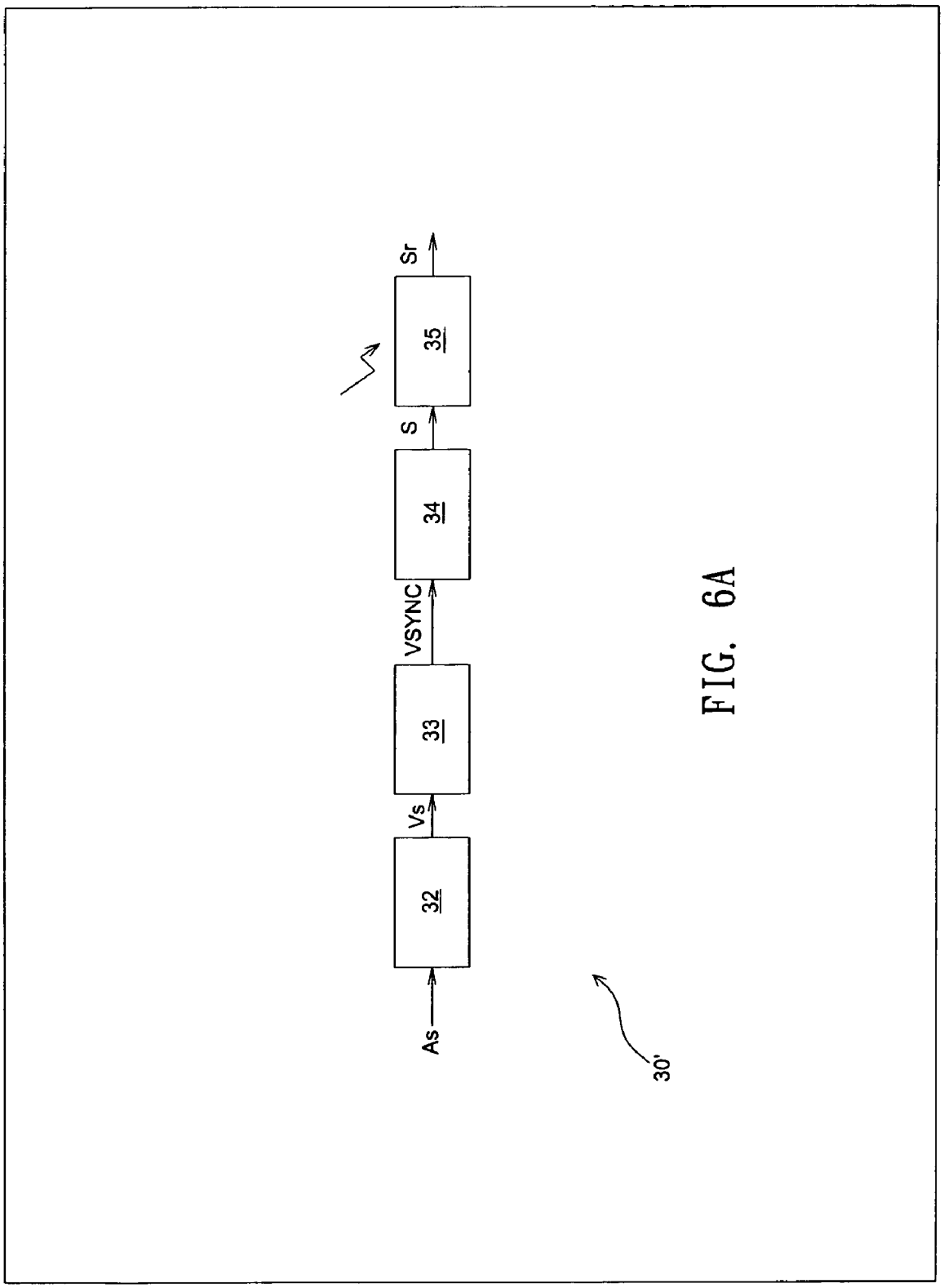
FIG. 6A shows a schematic diagram illustrating an image input system according to the invention.
Figure 6B:
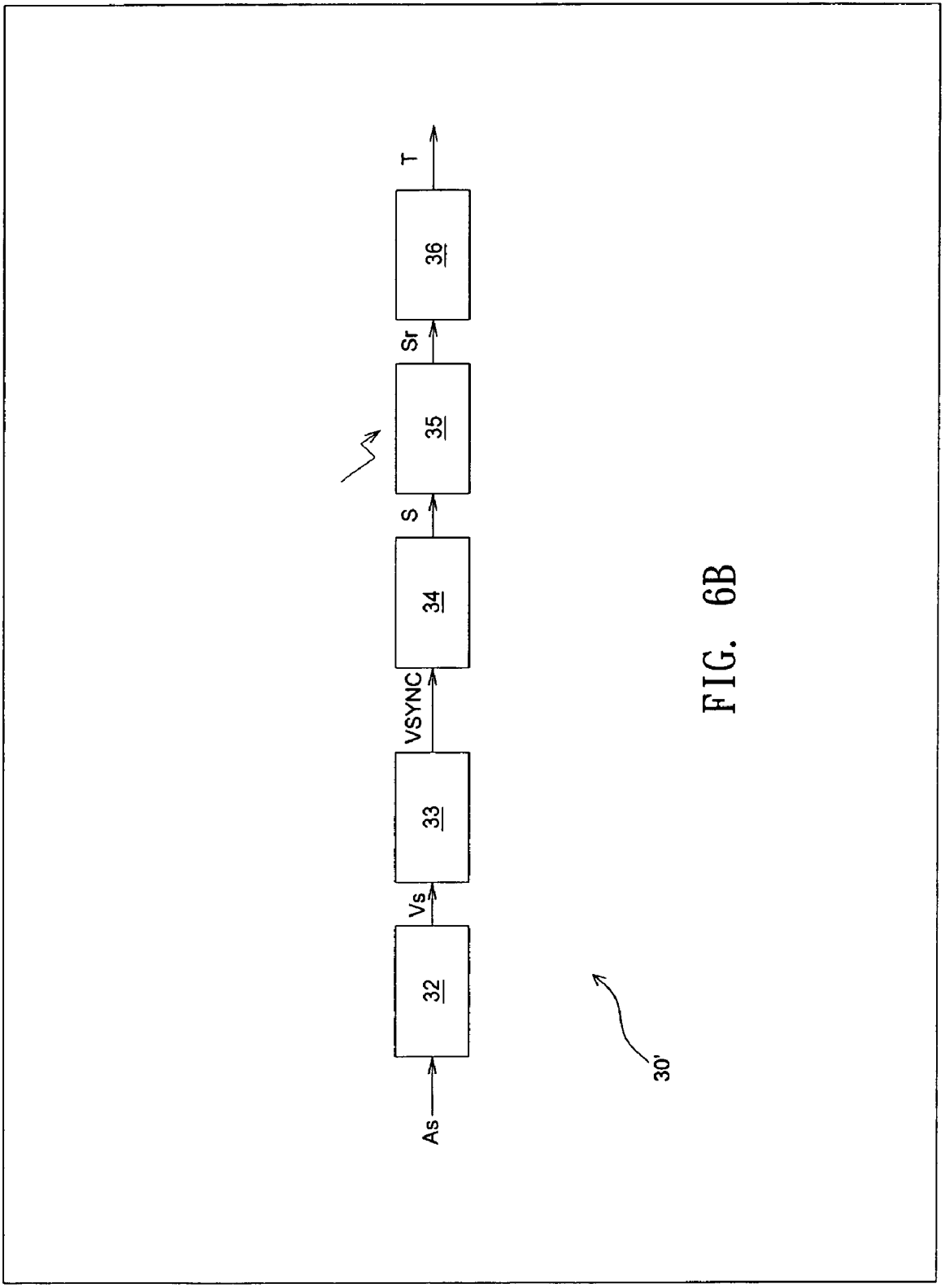
FIG. 6B shows another schematic diagram illustrating an image input system according to the invention.

FIG. 6A shows another embodiment of the invention, where an image input system 30' is independently used to achieve the effect of synchronizing the vertical synchronous signal VSYNC with the frequency of the analog signal As and eliminating the image flicker and color error. The image input system 30' shown in FIG. 6A includes a voltage comparator 32, a sensor/video period compensation unit 33, a sensor timing generator 34, and a sensor 35. Certainly, the image input system 30' may further include an image/color processing unit 36, as shown in FIG. 6B. The raw image data Sr or target image data T output by the image input system 30' may be fed into any storage media or transport interface.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image output/input system, comprising:
   a phase comparator for receiving a digital signal and a vertical synchronous signal and comparing their period and phase to generate a clock correction signal, wherein the digital signal is converted from an analog signal generated from a light source or a power source through an analog-to-digital conversion;
   an image synchronous signal generator for receiving the clock correction signal, generating the vertical synchronous signal, and adjusting a subsequent period of the vertical synchronous signal according to the clock correction signal;
   a sensor timing generator for receiving the vertical synchronous signal that is adjusted to synchronize with the analog signal in frequency and phase and generating the sensor control timing according to the vertical synchronous signal;
   a sensor for receiving the sensor control timing and generating raw image data after acquiring images, wherein the sensor control timing is synchronized with the analog signal to allow the time point of exposure of the sensor to synchronize with the analog signal;
   an image/color processing unit for receiving the raw image data and dealing with the image and color process of the raw image data to generate target image data; and
   a video encoder for receiving the vertical synchronous signal and the target image data and encoding the vertical synchronous signal and the target image data to generate analog encoded image data.

2. The image output/input system as claimed in claim 1, further comprising a phase adjusting unit for receiving the digital signal and delaying the phase of the digital signal.

3. The image output/input system as claimed in claim 1, wherein the image/color processing unit further deals with the image and color process of the raw image data.

4. The image output/input system as claimed in claim 1, wherein the analog signal is generated from a power source or a light source.

5. The image output/input system as claimed in claim 1, further comprising a voltage comparator for receiving the analog signal and converting the analog signal into the digital signal synchronized with the analog signal in both frequency and phase.

6. The image output/input system as claimed in claim 1, wherein the video encoder comprises:

a video timing generator for receiving the vertical synchronous signal and generating a video timing according to the vertical synchronous signal;

a luminance/chroma/burst/synchronous signal generator for receiving the video timing and the target image data, dealing with the integration and encoding for the luminance, chroma, burst, and image synchronization of the video timing and the target image data, and outputting digital encoded image data; and a digital to analog converter for receiving and converting the digital encoded image data into analog encoded image data.

7. An image input system, comprising:

a phase comparator for receiving a digital signal and a vertical synchronous signal and comparing their period and phase to generate a clock correction signal, wherein the digital signal is converted from an analog signal generated from a light source or a power source through an analog-to-digital conversion;

an image synchronous signal generator for receiving the clock correction signal, generating the vertical synchronous signal, and adjusting a subsequent period of the vertical synchronous signal according to the clock correction signal;

a sensor timing generator for receiving the vertical synchronous signal that is adjusted to synchronize with the analog signal in frequency and phase and generating the sensor control timing according to the adjusted vertical synchronous signal; and a sensor for receiving the sensor control timing and generating raw image data after acquiring images, wherein the sensor control timing is synchronized with the analog signal to allow the time point of exposure of the sensor to synchronize with the analog signal.

8. The image input system as claimed in claim 7, further comprising a phase adjusting unit for receiving the digital signal and delaying the phase of the digital signal.

9. The image input system as claimed in claim 7, further comprising an image/color processing unit for receiving the raw image data and dealing with the image and color process of the raw image data to generate target image data.

10. The image input system as claimed in claim 7, wherein the analog signal is generated from a power source or a light source.

11. The image input system as claimed in claim 7, further comprising a voltage comparator for receiving the analog signal and converting the analog signal into the digital signal synchronized with the analog signal in frequency and phase.

* * * * *